(12) United States Patent
Lucas et al.

(10) Patent No.: US 12,168,711 B2
(45) Date of Patent: Dec. 17, 2024

(54) WATER-EMULSIFIABLE ISOCYANATES WITH IMPROVED PROPERTIES

(71) Applicant: BASF SE, Ludwigshafen am Rhein (DE)

(72) Inventors: Frederic Lucas, Ludwigshafen am Rhein (DE); Harald Schaefer, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 396 days.

(21) Appl. No.: 17/621,709

(22) PCT Filed: Jun. 18, 2020

(86) PCT No.: PCT/EP2020/067000
§ 371 (c)(1),
(2) Date: Dec. 22, 2021

(87) PCT Pub. No.: WO2020/260133
PCT Pub. Date: Dec. 30, 2020

(65) Prior Publication Data
US 2022/0242996 A1   Aug. 4, 2022

(30) Foreign Application Priority Data

Jun. 24, 2019  (EP) .................................. 19182000

(51) Int. Cl.
| | | |
|---|---|---|
| C08G 18/08 | (2006.01) | |
| C08G 18/10 | (2006.01) | |
| C08G 18/22 | (2006.01) | |
| C08G 18/28 | (2006.01) | |
| C08G 18/48 | (2006.01) | |
| C08G 18/70 | (2006.01) | |
| C08G 18/73 | (2006.01) | |
| C08G 18/76 | (2006.01) | |
| C08G 18/78 | (2006.01) | |
| C08G 18/79 | (2006.01) | |
| C09D 175/08 | (2006.01) | |
| C09J 175/08 | (2006.01) | |

(52) U.S. Cl.
CPC ......... C08G 18/0866 (2013.01); C08G 18/10 (2013.01); C08G 18/222 (2013.01); C08G 18/283 (2013.01); C08G 18/4833 (2013.01); C08G 18/706 (2013.01); C08G 18/73 (2013.01); C08G 18/7621 (2013.01); C08G 18/7837 (2013.01); C08G 18/792 (2013.01); C09D 175/08 (2013.01); C09J 175/08 (2013.01); *C08G 2150/00* (2013.01); *C08G 2170/00* (2013.01)

(58) Field of Classification Search
CPC ............... C08G 18/0866; C08G 18/10; C08G 18/222; C08G 18/283; C08G 18/706; C08G 2150/00; C08G 18/73; C08G 18/7621; C08G 18/7837; C08G 18/792; C08G 18/4833; C08G 2170/00; C09D 175/08; C09J 175/08
See application file for complete search history.

(56) References Cited

U.S. PATENT DOCUMENTS

| | | | |
|---|---|---|---|
| 3,479,310 A | 11/1969 | Dieterich et al. | |
| 4,108,814 A | 8/1978 | Reiff et al. | |
| 4,190,566 A | 2/1980 | Noll et al. | |
| 4,288,586 A | 9/1981 | Bock et al. | |
| 4,324,879 A | 4/1982 | Bock et al. | |
| 5,235,018 A | 8/1993 | Potter et al. | |
| 9,683,127 B2 * | 6/2017 | Steinbrecher | ...... C08G 18/4269 |

(Continued)

FOREIGN PATENT DOCUMENTS

| | | |
|---|---|---|
| CN | 104394983 A | 3/2015 |
| CN | 109021541 A | 12/2018 |

(Continued)

OTHER PUBLICATIONS

International Search Report and Written Opinion received for PCT Patent Application No. PCT/EP2020/067000, mailed on Sep. 7, 2020, 12 pages.
"Natriumdithiophosphat", Wikipedia, last edited on May 27, 2021, 2 pages. URL: https://de.wikipedia.org/wiki/Natriumdithiophosphat.
International Preliminary Report on Patentability received for PCT Patent Application No. PCT/EP2020/067000, mailed on Jan. 6, 2022, 16 pages (8 pages of English Translation and 8 pages of Original Document).

*Primary Examiner* — Rabon A Sergent
(74) *Attorney, Agent, or Firm* — Faegre Drinker Biddle & Reath LLP

(57) ABSTRACT

A process for producing a water-emulsifiable polyisocyanate formulation, in which, in a first process step,
(A) a dispersion-active reaction product (E) is prepared from at least one diisocyanate selected from the group of hexamethylene 1,6-diisocyanate, pentamethylene 1,5-diisocyanate, 4,4'-di(isocyanatocyclohexyl)methane, 1-isocyanato-3,3,5-trimethyl-5-(isocyanatomethyl)cyclohexane, tolylene 2,4- and 2,6-diisocyanate, tetramethylxylylene diisocyanate, p-xylylene diisocyanate, 2,4'- and 4,4'-diisocyanatodiphenylmethane, with at least one mono- or polyhydric polyalkylene ether alcohol having 2 to 4 carbon atoms in the alkylene groups that comprises a polymer chain having at least 8 ethylene oxide units, and the resultant reaction product (E), in a second process step,
(B) is mixed with at least one (cyclo)aliphatic polyisocyanate having an average NCO functionality of 2.2 to 5.0, preferably of 2.5 to 4.0,
wherein step (B) is performed in the presence of an allophanatization catalyst and the conditions are chosen such that (E) and the polyisocyanate form allophanate groups, characterized in that the allophanatization catalyst is at least one salt consisting of a metal cation and at least one dithiophosphate anion.

15 Claims, No Drawings

(56) References Cited

U.S. PATENT DOCUMENTS

| | | | |
|---|---|---|---|
| 9,902,871 B2* | 2/2018 | Steinbrecher | C08G 18/3868 |
| 9,944,771 B2* | 4/2018 | Lucas | C08G 18/706 |
| 10,597,467 B2* | 3/2020 | Brandau | C08K 5/29 |
| 10,696,776 B2* | 6/2020 | Lucas | C08G 18/0852 |
| 11,518,907 B2* | 12/2022 | Lucas | C08G 18/706 |
| 2015/0073065 A1 | 3/2015 | Keaton et al. | |

FOREIGN PATENT DOCUMENTS

| | | |
|---|---|---|
| DE | 1174495 B | 7/1964 |
| DE | 2616416 A1 | 11/1977 |
| DE | 2651505 A1 | 5/1978 |
| DE | 2732131 A1 | 1/1979 |
| DE | 2811148 A1 | 9/1979 |
| DE | 10350242 A1 | 5/2005 |
| EP | 0003765 A1 | 9/1979 |
| EP | 0010589 A1 | 5/1980 |
| EP | 0047452 A1 | 3/1982 |
| EP | 0206059 A2 | 12/1986 |
| EP | 0486881 A2 | 5/1992 |
| EP | 0712840 A1 | 5/1996 |
| EP | 0524500 B1 | 11/1996 |
| EP | 0798299 A1 | 10/1997 |
| EP | 0896009 A1 | 2/1999 |
| EP | 0959087 A1 | 11/1999 |
| EP | 0962454 A1 | 12/1999 |
| EP | 0962455 A1 | 12/1999 |
| EP | 1061091 A2 | 12/2000 |
| EP | 1445271 A1 | 8/2004 |
| EP | 2368928 A2 | 9/2011 |
| GB | 990632 A * | 4/1965 |
| GB | 0990635 A | 4/1965 |
| GB | 1076688 A | 7/1967 |
| GB | 1571933 A | 7/1980 |
| WO | 2001/040347 A1 | 6/2001 |
| WO | 2005/095481 A1 | 10/2005 |
| WO | 2005/097737 A1 | 10/2005 |
| WO | 2005/097865 A1 | 10/2005 |
| WO | 2007/063027 A1 | 6/2007 |
| WO | 2008/116764 A1 | 10/2008 |
| WO | 2013/079481 A2 | 6/2013 |
| WO | 2014/147231 A1 | 9/2014 |

* cited by examiner

WATER-EMULSIFIABLE ISOCYANATES WITH IMPROVED PROPERTIES

CROSS-REFERENCE TO RELATED APPLICATIONS

This application is a national stage application (under 35 U.S.C. § 371) of PCT/EP2020/067000, filed Jun. 18, 2020, which claims benefit of European Application No. 19182000.0, filed Jun. 24, 2019, both of which are incorporated herein by reference in their entirety.

The present invention relates to a two-stage process for producing a water-emulsifiable polyisocyanate formulation, in which, in a step (A), a dispersion-active reaction product is prepared from at least one diisocyanate and at least one polyalkylene ether alcohol and, in a second step (B), the reaction product is mixed with an aliphatic polyisocyanate in the presence of a particular allophanatization catalyst. The invention further relates to a polymer dispersion comprising the water-emulsifiable polyisocyanate formulation, which is obtainable by the process, and to the use of the formulation in aqueous coating compositions and in adhesive dispersions.

Water-emulsifiable polyisocyanate formulations are known in principle. A particular role is played by water-dispersible polyisocyanates as crosslinker components for water-thinnable two-component polyurethane (2K PUR) paints. In combination with aqueous polyol dispersions, they permit the formulation of solvent-free paint systems that cure even at room temperature to give high-quality coatings that are in no way inferior to conventional paints with regard to solvents and chemical resistance or mechanical durability.

Polyisocyanate components used in such formulations are especially polyisocyanates that have isocyanate groups and are based on aliphatic and/or cycloaliphatic diisocyanates. In order to achieve emulsifiability in water, it is firstly known that the polyisocyanates can be reacted directly with hydrophilic polyoxyalkylene groups in a suitable manner.

Examples of such compositions or formulations are disclosed in EP-A 206 059, EP-A 959 087 or WO 01/40347.

In addition, two-stage processes are also known. EP-A 486 881 discloses a two-stage process in which, in a first step, an emulsifier is first synthesized from a diisocyanate and polyalkylene ether alcohols. This emulsifier is mixed in a second step with at least one aliphatic polyisocyanate, which affords a water-emulsifiable formulation. A two-stage process ultimately permits better control over the properties compared to one-stage processes. Disadvantageously, however, good emulsifiability, i.e. use of a high concentration of polyalkylene ether groups, is frequently at the cost of other properties, for example paint hardness.

DE 10350242 discloses using polyalkylene ether alcohols and diisocyanates to prepare a dispersion-active product, and then reacting the latter with aliphatic isocyanates to form allophanate groups.

A disadvantage is that the products described therein have a relatively high color number that increases during storage.

EP2368928 describes the use of zinc compounds as allophanatization catalysts.

WO 2007/063027 describes water-emulsifiable radiation-curable polyisocyanates. Polyalkylene ether alcohols used are preferably those having a low salt content.

WO 2008/116764 describes the preparation of water-emulsifiable polyisocyanates by trimerizing at least one diisocyanate in the presence of a polyalkylene ether alcohol. Polyalkylene ether alcohols used are preferably those having a low salt content.

WO 05/97865 describes the stabilization of allophanates formed from di- or polyisocyanates with polyhydroxy compounds with Brønsted acids. The allophanates are preferably prepared with zinc 2-ethylhexanoate; polyhydroxy compounds described explicitly are polyalkylene glycols, prepared in a base-free manner by DMC catalysis.

WO 2005/97737 discloses using (cyclo)aliphatic di- and polyisocyanates and polyhydroxy compounds first to prepare a prepolymer containing urethane groups, the urethane groups of which are then reacted with polyisocyanate to give allophanate groups, with catalysis by zinc compounds. Polyhydroxy compounds described are polyalkylene glycols, prepared in a base-free manner by DMC catalysis.

WO 2005/95481 describes a similar process with particular polyhydroxy compounds. The products have a low color number.

EP 712 840 describes the preparation of polyisocyanates containing allophanate groups by reaction of urethanes essentially free of isocyanate and hydroxyl groups to form allophanate groups, followed by distillative removal of the unconverted excess polyisocyanate. Catalysts mentioned include zinc compounds.

EP 959087 describes aqueous polyisocyanates containing polyethylene glycol having 5-35 EO units, bonded via allophanate groups with an allophanate group content of at least 60%. Particularly preferred allophanatization catalysts are zinc(II) n-octanoate, zinc(II) 2-ethyl-1-hexanoate and/or zinc(II) stearate (page 5, paragraph [0040]).

WO 2001/40347 describes the same with an allophanate group content of <60%.

U.S. Pat. No. 5,235,018 and EP 524500B1 describe an aqueous coating composition containing non-water-dispersible and water-insoluble polyisocyanate with monoisocyanurate:monoallophanate groups in a ratio of 10:1-1:5. The allophanate is based on a monoalcohol with molar mass up to 2500 D.

Catalysts described are solely ammonium salts.

EP 1 061 091 describes lightfast polyurethanes having good solubility in nonpolar solvents by reaction of (cyclic) aliphatic isocyanates with constituents containing alkoxy groups under zinc catalysis.

EP 1 445 271 describes particular polyisocyanate compositions containing mono- and polyallophanates with 20-60% by weight of products having a molar mass of less than 700 D and a proportion of 40-80% by weight of products having a molar mass of more than 700 D, and a molar ratio of allophanate isocyanurate groups of 100:0-75:25. Catalysts disclosed include zinc salts.

It was therefore an object of the invention to provide a two-stage process for producing water-emulsifiable polyisocyanurate formulations that afford readily emulsifiable products with simultaneously good performance properties, especially improved color number. Accordingly, a two-stage process for producing a water-emulsifiable polyisocyanate formulation has been found, in which, in a first process step, (A) a dispersion-active reaction product (E) is prepared from at least one diisocyanate selected from the group of hexamethylene diisocyanate, 4,4'-di(isocyanatocyclohexyl)methane, 1-isocyanato-3,3,5-trimethyl-5-(isocyanatomethyl)cyclohexane, tolylene 2,4- and 2,6-diisocyanate, tetramethylxylylene diisocyanate, p-xylylene diisocyanate, 2,4'- and 4,4'-diisocyanatodiphenylmethane, with at least one mono- or polyhydric polyalkylene ether alcohol having 2 to 4 carbon atoms in the alkylene groups that comprises a polymer chain having at least 8 ethylene oxide units, and the resultant reaction product (E), in a second process step, (B) is mixed with at least one (cyclo)aliphatic polyisocyanate having an average NCO functionality of 2.2 to 5.0, preferably of 2.5 to 4.0, wherein step (B) is performed in the presence of an allophanatization catalyst and the conditions are chosen such that (E) and the polyisocyanate form allophanate groups, wherein the allophanatization catalyst is at least one salt consisting of a metal cation and at least one dithiophosphate anion.

Additionally found have been water-emulsifiable polyisocyanate formulations obtainable by the process of the invention, and the use thereof in aqueous coating compositions and adhesive dispersions.

The formulations of the invention have improved color numbers compared to the products prepared according to EP 2 368 928. Paints produced with the formulations of the invention have greater hardness and improved water resistance.

Specific details of the invention are as follows:

In step (A) of the process of the invention, the dispersion-active reaction product (E) is first synthesized from at least one diisocyanate and at least one polyalkylene ether alcohol. (E), or its reaction product with the polyisocyanate to give the allophanate, serves as emulsifier when the nonaqueous formulation is emulsified or dispersed in an aqueous medium for use. The diisocyanate is at least one selected from the group of hexamethylene 1,6-diisocyanate, pentamethylene 1,5-diisocyanate, 4,4'-di(isocyanatocyclohexyl)methane, 1-isocyanato-3,3,5-trimethyl-5-(isocyanatomethyl)cyclohexane, tolylene 2,4- and 2,6-diisocyanate, tetramethylxylylene diisocyanate, p-xylylene diisocyanate and 2,4- and 4,4'-diisocyanatodiphenylmethane, Preference is given to 2,4'- and 4,4'-diisocyanatodiphenylmethane (MDI) and 4,4'-di(isocyanatocyclohexyl)methane (HMDI), and especially to tolylene 2,4- and 2,6-diisocyanate (TDI). In many cases, hexamethylene diisocyanate (HDI) and 1-isocyanato-3,3,5-trimethyl-5-(isocyanatomethyl)cyclohexane (IPDI) have been found to be useful, more preferably tolylene 2,4- and 2,6-diisocyanate (TDI).

The diisocyanate component is reacted with a polyalkylene ether alcohol. The alkylene group in the polyalkylene ether alcohol typically has 2 to 4 carbon atoms, typical examples include —$CH_2$—$CH(CH_3)$—, —$(CH_2)_4$— and preferably —$(CH_2)_2$—. The polyalkylene ether alcohols can be prepared in a known manner by alkoxylation of suitable starters, for example alcohols. It is possible to use polyfunctional starters or preferably monofunctional starters, and a polyalkylene ether alcohol is accordingly also polyvalent or preferably monovalent. Examples of suitable starter molecules include glycol hexanol, 3-methyl-3-hydroxymethyloxetane, phenol, ethylene glycol, propylene glycol, aniline, pentaerythritol, trimethylolpropane or glycerol. Preference is given to $C_1$-$C_6$-alkanols, and among these particular preference to methanol, ethanol, n-propanol or n-butanol. Typically, they are prepared under acidic or basic catalysis. For many applications of polyalkylene ether alcohols, subsequent desalination of the products is customary. It is a feature of the invention that the polyalkylene ether alcohol used has an acid number less than 5 mmol/kg, preferably less than 4, more preferably less than 3, even more preferably less than 2 and especially less than 1 mmol/kg. The polyalkylene ether chains may be mixed, for example formed from ethylene oxide and propylene oxide units. The chains comprise generally 8 to 70, preferably 10 to 20, ethylene oxide units. Good results are achieved when the polyalkylene ether alcohol comprises at least 60% by weight, preferably at least 80% by weight, of ethylene oxide units. Particular preference is given to pure polyethylene oxide chains.

The numerical ratio of OH groups to NCO groups in step (A) is typically 0.6 to 1.2, preferably 0.8 to 1.2, more preferably 0.9 to 1.1 and most preferably about 1:1.

This reaction of the polyalkylene ether alcohol with the diisocyanate is known per se and typically proceeds at temperatures of 10 to 150° C., preferably of 20 to 100° C. The reaction time is generally such that the groups of the polyalkylene ether alcohol that are reactive with isocyanate groups have been reacted with isocyanate to an extent of at least 90%. The reaction can be accelerated by the additional use of catalytically active substances known per se. Possible catalysts are metal salts. These metal salts preferably comprise, as metal cation, Li, Na, K, Ba, Cs, Sb, Al, Fe, Bi, Ge, Sn, Hg, Ti, Zr or Zn cations. The metal salts more preferably comprise Al, Cs, Bi, Sn, Zr or Zn cations.

In step (B) of the process of the invention, reaction product (E) is blended with an aliphatic polyisocyanate having an average NCO functionality of 2.2 to 5.0, preferably of 2.5 to 4.0, and converted to the allophanate.

Step (B) preferably directly follows after step (A), but it is also possible first to store (E) and to react it with the polyisocyanate at a later juncture.

The aliphatic polyisocyanate generally has an NCO content of 5% to 30% by weight, preferably of 10% to 25% by weight.

Aliphatic polyisocyanates for the purposes of the invention are:

1. Polyisocyanates having isocyanurate groups and based on aliphatic and/or cycloaliphatic diisocyanates. Particular preference is given to the corresponding isocyanatoisocyanurates based on 1,6-diisocyanatohexane, 1,5-pentamethylenediisocyanate and/or 1-isocyanato-3,3,5-trimethyl-5-(isocyanatomethyl)cyclohexane (isophorone diisocyanate (IPDI)). The preparation of polyisocyanates of this kind containing isocyanurate groups is described for example in DE-A 2 616 416, EP-A 3765, EP-A 10 589, EP-A 47 452, U.S. Pat. No. 4,288,586 or US-A 4 324 879. In principle it is possible for the polyisocyanate formulation of the invention to include not only these particularly preferred compounds but also any desired polyisocyanates containing isocyanurate groups and based on aliphatic and/or cycloaliphatic diisocyanates. Suitable isocyanatoisocyanurates are especially simple trisisocyanatoalkyl (or -cycloalkyl) isocyanurates of the formula

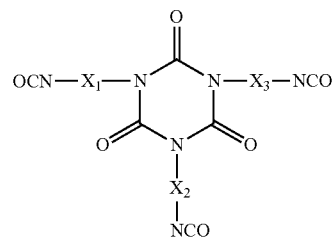

or mixtures thereof with their higher homologs containing more than one isocyanurate ring, in which formula $X_1$, $X_2$ and $X_3$ are identical or different radicals and are the parent hydrocarbon radical of the starting diisocyanate. The isocyanatoisocyanurates generally have an NCO content of 10% to 30%, preferably 15% to 25%, by weight and an average NCO functionality of 2.2 to 5.0, preferably of 2.5 to 4.0.

Aliphatic polyisocyanates for the purposes of the invention are also:

2. Polyisocyanates having biuret groups and having aliphatically bonded isocyanate groups, especially tris(6-isocyanatohexyl)biuret or mixtures thereof with higher homologs thereof. These polyisocyanates having biuret groups generally have an NCO content of 18% to 26%, preferably of 20% to 23%, by weight and an average NCO functionality of 3 to 4, preferably of 3 to 3.5.

Aliphatic polyisocyanates for the purposes of the invention are also:

3. Polyisocyanates having urethane and/or allophanate groups and having aliphatically or cycloaliphatically bonded isocyanate groups, as obtainable, for example, by reacting excess amounts of hexamethylene diisocyanate or of IPDI with simple polyhydric alcohols, for example trimethylolpropane, glycerol, 1,2-dihydroxypropane or mixtures thereof. These polyisocyanates having urethane and/or allophanate groups generally have an NCO content of 12% to 20% by weight and an average NCO functionality of 2.5 to 3. These mixtures typically comprise relevant proportions of polyisocyanates having isocyanurate groups.

4. Polyisocyanates having isocyanurate groups and asymmetric (iminooxadiazinedione) isocyanurate groups and based on aliphatic and/or cycloaliphatic diisocyanates. Particular preference is given to the corresponding isocyanatoisocyanurates based on 1,6-diisocyanatohexane, 1,5-pentamethylenediisocyanate and/or 1-isocyanato-3,3,5-trimethyl-5-(isocyanatomethyl)cyclohexane (isophorone diisocyanate (IPDI)). The preparation of such polyisocyanates having isocyanurate groups is described, for example, in EP 798299, EP 896009, EP 962454, EP 962455, WO13079481 or WO 2014147231. In principle it is possible for the polyisocyanate formulation of the invention to include not only these particularly preferred compounds but also any desired polyisocyanates containing isocyanurate groups and based on aliphatic and/or cycloaliphatic diisocyanates. Suitable (a)symmetric isocyanatoisocyanurates are especially simple trisisocyanatoalkyl (or -cycloalkyl) isocyanurates of the formula

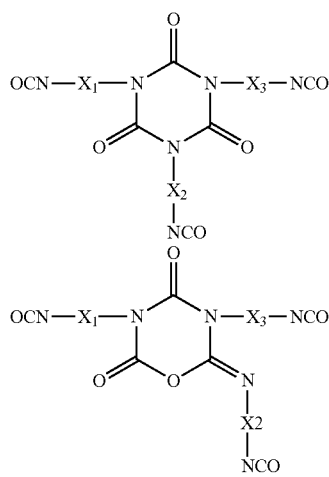

or mixtures thereof with their higher homologs containing more than one isocyanurate ring, in which formula $X_1$, $X_2$ and $X_3$ are identical or different radicals and are the parent hydrocarbon radical of the starting diisocyanate. The (a)symmetric isocyanatoisocyanurates generally have an NCO content of 10% to 30%, preferably 15% to 25%, by weight and an average NCO functionality of 2.2 to 5.0, preferably of 2.5 to 4.0.

Preference is given to using polyisocyanates of groups 1 and 2. It is of course also possible to use a mixture of the polyisocyanates mentioned.

The reaction product (E) is typically used in such an amount that the water-emulsifiable polyisocyanate formulation comprises 1% to 25% by weight, preferably 5-20% by weight and more preferably 10-20% by weight thereof.

For this purpose, step (B) is performed in the presence of a suitable allophanatization catalyst. The allophanatization catalyst can be added here before or during step (B). It is alternatively possible to add the allophanatization catalyst actually before or during step (A). Since the NCO groups react preferentially with OH groups present, the formation of allophanate groups in step (A) is generally negligible on account of the stoichiometry chosen.

Allophanatization catalysts are known in principle to those skilled in the art.

Allophanatization catalysts suitable for the execution of the process of the invention are salts consisting of a metal cation and at least one dithiophosphate anion.

The metal cation is preferably a mono- and divalent metal cation.

Examples of the metal cation are Li, Cs, Na, K, Sb, Fe, Bi, Ge, Sn, Ba, Hg, Ti, Zr and Zn. A particularly preferred metal cation is Zn.

Examples of the at least one dithiophosphate anion are, for example, O,O-diethyldithiophosphate, O,O-di-2-ethylhexyldithiophosphate, O,O-di-2-propylheptyldithio-phosphate, O,O-diisobutyldithiophosphate, O,O-dicyclohexyldithiophosphate and O,O-bis-2,4,4-trimethylpentyldithiophosphate and mixtures thereof. Preferred O,O-dithiophosphate anions are O,O-diisobutyldithiophosphate, O,O-diethyldithiophosphate and O,O-di-2-ethylhexyldithiophosphate and mixtures thereof.

Examples of mixtures are mixed O,O-bis(2-ethylhexyl and isobutyl)dithiophosphates, mixed O,O-bis(1,3-dimethylbutyl and isopropyl)dithiophosphates, mixed O,O-bis(2-ethylhexyl and isobutyl and isopropyl)dithiophosphates, mixed O,O-bis(2-ethylhexyl and isobutyl and pentyl)dithiophosphates, mixed O,O-bis(2-ethylhexyl and isobutyl)dithiophosphates, mixed O,O-bis(2-ethylhexyl and isopropyl) dithiophosphates, mixed O,O-bis(branched and linear pentyl and isobutyl)dithiophosphates, mixed O,O-bis(ethyl and hexyl and isopropyl)dithiophosphates, mixed O,O-bis(hexyl and isobutyl and isopropyl)dithiophosphates, mixed O,O-bis(hexyl and isobutyl and isopentyl and isopropyl)dithiophosphates, mixed O,O-bis(hexyl and isobutyl)dithiophosphates, mixed O,O-bis(hexyl and isopropyl) dithiophosphates, mixed O,O-bis(isobutyl and isopropyl) dithiophosphates, mixed O,O-bis(isobutyl and isooctyl and isopropyl)dithiophosphates, mixed O,O-bis(isobutyl and isooctyl and pentyl)dithiophosphates, mixed O,O-bis (isobutyl and pentyl)dithiophosphates, mixed O,O-bis(isopropyl and methylcyclohexyl)dithiophosphates, mixed O,O-bis(isodecyl and isopropyl)dithiophosphates, mixed O,O-bis (sec-butyl and 1,3-dimethylbutyl)dithiophosphates and mixed O,O-bis(sec-butyl and isooctyl)dithiophosphates, especially mixed O,O-bis(2-ethylhexyl and isobutyl)dithiophosphates.

In the case of chiral compounds, it is unimportant in accordance with the invention which enantiomer or diastereomer is used, or whether the acids are used in racemic form.

Dithiophosphate anions in the context of this document have the structural unit $S=P(OR)_2S^-$ where the two R radicals are organic radicals, which may be the same or different. The structural units may be present once or more than once within the same catalyst molecule, for example one to six times, preferably one to four times, even more preferably one to three times, in particular one to two times and especially once.

Allophanatization catalysts are preferably a salt of the formula

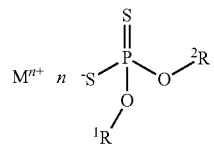

in which
M=Li, Na, Cs, K, Sb, Fe, Al, Bi, Ge, Sn, Ba, Hg, Ti, Zr or Zn, more preferably Al, Cs, Bi, Zr, Sn or Zn,
$R^1$ and $R^2$ may be the same or different and may each independently be a straight-chain or branched $C_1$- to $C_{20}$-alkyl group, an optionally substituted $C_5$- to $C_{12}$-cycloalkyl group, an optionally substituted $C_7$- to $C_{10}$-aralkyl group, an optionally substituted $C_6$-$C_{12}$-aryl group, hydrogen, or a $C_1$-$C_{20}$-alkyl group or $C_6$ to $C_{12}$-aryl group optionally interrupted by one or more oxygen and/or sulfur atoms and/or one or more substituted or unsubstituted amino groups or substituted by functional groups, aryl, alkyl, aryloxy, alkyloxy, halogen, heteroatoms and/or heterocycles,
and n is a positive integer.

In this formula,
a straight-chain or branched $C_1$- to $C_{20}$-alkyl group is, for example, methyl, ethyl, propyl, isopropyl, n-butyl, isobutyl, sec-butyl, tert-butyl, pentyl, 1,1-dimethylpropyl, hexyl, 1,1-dimethylbutyl, 1,3-dimethylbutyl, heptyl, octyl, isooctyl, 2-ethylhexyl, 2,4,4-trimethylpentyl, 1,1,3,3-tetramethylbutyl, neodecyl, decyl or dodecyl,
an optionally substituted $C_5$- to $C_{12}$-cycloalkyl group is cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl and a saturated or unsaturated bicyclic system, for example norbornyl or norbornenyl,
an optionally substituted $C_7$- to $C_{10}$-aralkyl group is, for example, benzyl, 1-phenylethyl, 2-phenylethyl, α,α-dimethylbenzyl, benzhydryl, p-tolylmethyl, 1-(p-butylphenyl)ethyl, o-, m- or p-chlorobenzyl, 2,4-dichlorobenzyl, o-, m- or p-methoxybenzyl or o-, m- or p-ethoxybenzyl,
an optionally substituted $C_5$-$C_{12}$-aryl group is, for example, phenyl, 2-, 3- or 4-methylphenyl, α-naphthyl or β-naphthyl,
a $C_1$-$C_{20}$-alkyl group optionally interrupted by one or more oxygen and/or sulfur atoms and/or one or more substituted or unsubstituted amino groups or substituted by functional groups, aryl, alkyl, aryloxy, alkyloxy, halogen, heteroatoms and/or heterocycles is, for example, 2-carboxyethyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 1-hydroxy-1,1-dimethylmethyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl and
a $C_6$ to $C_{12}$-aryl group optionally interrupted by one or more oxygen and/or sulfur atoms and/or one or more substituted or unsubstituted imino groups or substituted by functional groups, aryl, alkyl, aryloxy, alkyloxy, halogen, heteroatoms and/or heterocycles is, for example, tolyl, xylyl, 4-diphenylyl, chlorophenyl, dichlorophenyl, trichlorophenyl, difluorophenyl, methylphenyl, dimethylphenyl, trimethylphenyl, ethylphenyl, diethylphenyl, iso-propylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl.

Examples of $R^1$ and $R^2$ are independently hydrogen, methyl, ethyl, n-propyl, n-butyl, tert-butyl, pentyl, hexyl, heptyl, octyl, 2-ethylhexyl, 2-propylheptyl, phenyl, α- or β-naphthyl, benzyl, cyclopentyl, cyclohexyl, hydroxymethyl, 2-hydroxyethyl, 2-carboxyethyl, 2-methoxycarbonylethyl, 2-ethoxycarbonylethyl, 2-n-butoxycarbonylethyl, 2,4,4-trimethylpentyl, 1,3-dimethylbutyl or 2-cyanoethyl. Preference is given to hydrogen, methyl, ethyl, n-propyl, n-butyl, tert-butyl, cyclohexyl, phenyl, 2-carboxyethyl, 2,4,4-trimethylpentyl, 2-hydroxyethyl, 2-ethylhexyl and 1,3-dimethylbutyl; particular preference is given to hydrogen, methyl, ethyl, n-butyl, tert-butyl, 2-ethylhexyl, 2-propylheptyl, cyclohexyl, 2,4,4-trimethylpentyl and phenyl; very particular preference is given to hydrogen, methyl, ethyl, 2,4,4-trimethylpentyl, 2-ethylhexyl, 2-propylheptyl and n-butyl, and especially to 2-ethylhexyl and n-butyl.

If the $R^1$ and $R^2$ radicals form a ring, these may be, for example, 1,4-butylene or 1,5-pentylene.

Most preferably, M is Zn, and $R^1$ and $R^2$ are independently a straight-chain or branched $C_1$- to $C_{20}$-alkyl group.

These catalysts are used in the process of the invention in an amount of 0.001% to 5% by weight, preferably 0.005% to 1% by weight, based on the total weight of the coreactants.

In general, the allophanatization is conducted at elevated temperatures, for example at 40 to 140° C., preferably 60 to 100° C. It is a preferred embodiment of the present process that reaction step (B) is conducted at a reaction temperature at least 10° C. higher than reaction step (A), preferably at least 15° C. higher and more preferably at least 20° C. higher.

Accordingly, reaction step (A) is preferably conducted at a temperature of 40 to 85° C., preferably 50 to 65° C., and reaction step (B) at a correspondingly higher temperature.

The degree of conversion can be monitored, for example, by titrimetric determination of the NCO content.

The degree of allophanatization is determined by the person skilled in the art according to the desired properties of the water-emulsifiable formulation. It has been found to be useful that at least 10 mol % of the urethane groups in the reaction product (E) formed in step (A) are converted to allophanate groups. The level of conversion is preferably 20 to 100 mol % and more preferably 40 to 100 mol %.

The mixing and conversion should preferably be effected with vigorous stirring. In order to avoid excessively high viscosities, it is also possible for inert solvents to be present.

The polyisocyanate formulation thus prepared is preferably used in neat form. It is of course also possible to add small amounts to the formulation prior to use thereof, i.e., for example, 1% to 40% by weight, based on the solvent-free formulation, of an organic solvent, for example ethyl acetate, butyl acetate, acetone, methoxypropyl acetate, propylene carbonate, 3-methoxy-n-butyl acetate, 2-(2-butoxyethoxy)ethyl acetate, dipropylene glycol n-butyl ether, propylene glycol diacetate, dipropylene glycol dimethyl ether or methyl ethyl ketone, in order to reduce the viscosity. It is course also possible to use mixtures of the solvents mentioned. In addition, it is possible to process the polyisocyanate formulations of the invention to give aqueous emulsions or dispersions having a water content of generally 90% to 35% by weight.

The polyisocyanate formulations of the invention may preferably be dispersed in water for production of aqueous dispersions; more preferably, the polyisocyanate formulations of the invention are mixed into aqueous dispersions.

The polyisocyanate formulation of the invention is suitable for modification of aqueous coating compositions (paint, protective coatings), for example for wood, wood veneer, paper, paperboard, cardboard, textile, leather, nonwoven, plastic surfaces, glass, ceramic, mineral building materials such as cement moldings and fiber cement boards, metals or coated metals, adhesive or impregnating agent, for example for coloring, based on aqueous dispersions or solutions of solids content 5% to 40% by weight, preferably 5% to 20% by weight. Useful coating compositions include the aqueous dispersions, known per se, of homopolymers and copolymers of olefinically unsaturated monomers or polyurethanes, or else solutions of natural products, for example of casein.

The polyisocyanate formulations of the invention are added to the aqueous coating compositions generally in an amount of 1% to 25%, preferably of 2.5% to 20%, by weight, based on the solids content of the coating composition.

They are applied to the substrate in a known manner, for example by spraying, in an amount of 5 to 50 g of solids/m².

Suitable dispersions of homopolymers or copolymers of olefinically unsaturated monomers are, for example, conventional dispersions of homopolymers or copolymers based on vinyl esters of carboxylic acids having 2 to 18, preferably 2 to 4, carbon atoms, such as vinyl acetate in particular, optionally with up to 70% by weight, based on total amount of olefinically unsaturated monomers, of other olefinically unsaturated monomers, and/or dispersions of homopolymers or copolymers of (meth)acrylic esters of alcohols having 1 to 18, preferably 1 to 4, carbon atoms, such as methyl (meth)acrylate, ethyl (meth)acrylate, propyl (meth)acrylate, hydroxyethyl (meth)acrylate or hydroxypropyl (meth)acrylate in particular, optionally together with up to 70% by weight of other olefinically unsaturated monomers, and/or dispersions of butadiene-styrene copolymers having a butadiene content of about 20 to 60% by weight, and/or of other diene polymers or copolymers such as polybutadiene or copolymers of butadiene with other olefinically unsaturated monomers such as styrene, acrylonitrile and/or methacrylonitrile, for example, and/or aqueous dispersions of polymers or copolymers of 2-chloro-1,3-butadiene, optionally with other olefinically unsaturated monomers of the type exemplified above, for example those with a chlorine content of about 30 to 40% by weight, in particular with a chlorine content of about 36% by weight.

Preference is given to aqueous dispersions of copolymers formed from 90% to 99.5% by weight of acrylates or methacrylates of alkanols containing 1 to 4 carbon atoms and 0.5% to 10% by weight, based in each case on the copolymer, of hydroxyalkyl acrylates and methacrylates having 2 to 20 carbon atoms in the hydroxyalkyl radical, such as hydroxyethyl, hydroxypropyl or hydroxybutyl acrylate or methacrylate. Such dispersions are known per se and can be prepared in conventional manner by emulsion polymerization (see Houben-Weyl, Methoden der organischen Chemie [Methods of Organic Chemistry], 4th edition, vol. E 20, p. 217 ff.).

Suitable aqueous polyurethane dispersions are those of the type known per se, as described, for example, in U.S. Pat. No. 3,479,310, GB-A 1 076 688, U.S. Pat. No. 4,108, 814, US-A 4 092 286, DE-A 2 651 505, U.S. Pat. No. 4,190,566, DE-A 2 732 131 or DE-A 2 811 148.

The aqueous dispersions used may comprise the customary auxiliaries and additives. These include, for example, fillers, such as quartz flour, quartz sand, finely divided silica, heavy spar, calcium carbonate, chalk, dolomite or talc, which are often used together with suitable wetting agents, such as polyphosphates, for example, such as sodium hexametaphosphate, naphthalenesulfonic acid, ammonium or sodium salts of polyacrylic acids, the wetting agents generally being added in amounts of 0.2% to 0.6% by weight, based on filler.

Further suitable auxiliaries are, for example, organic thickeners, to be used in amounts of 0.01% to 1% by weight, based on the dispersion, such as cellulose derivatives, alginates, starch or starch derivatives or polyacrylic acid, for example, or inorganic thickeners, to be used in amounts of 0.05% to 5% by weight, based on the dispersion, such as bentonites, for example.

Fungicides for preservation can also be added to the dispersions. They are generally used in amounts of 0.02% to 1% by weight, based on the dispersion. Examples of suitable fungicides include phenol and cresol derivatives, and organotin compounds.

Substrates for impregnations are, for example, synthetic or nonsynthetic fibers or fabrics or nonwovens thereof.

The polyisocyanate formulations of the invention may be dispersed in very finely divided form in aqueous dispersions. Furthermore, a small added amount of the water-emulsifiable polyisocyanate is required in order to establish the desired properties of the dispersion, or achieve them on application.

The polyisocyanate formulations of the invention may of course be admixed with auxiliaries and additives that are customary in paints technology. These include, for example, defoamers, thickeners, leveling aids, pigments, emulsifiers, dispersing aids, and also solvents. The desired processing viscosity is established by addition of water.

For production of the dispersions, simple emulsification techniques are sufficient in most cases, for example with a mechanical stirrer, or else often even simple mixing of the two components by hand, in order to achieve dispersions having very good properties. It is of course alternatively possible to use mixing techniques with higher shear energy, for example jet dispersion.

The coating compositions comprising the polyisocyanate formulations of the invention may especially be used as primers, primer surfaces, pigmented topcoat materials and clearcoat materials in the sectors of automotive refinishing and finishing of large vehicles. The coating compositions are especially suitable for applications requiring particularly high application reliability, exterior weathering resistance, optical qualities, solvent resistance, chemical resistance and water resistance, such as in automotive refinishing and finishing of large vehicles.

The coating compositions comprising the polyisocyanate formulations of the invention may be applied by a very wide variety of spraying methods, such as compressed air, airless or electrostatic spraying methods, using one- or two-component spraying units, or else by injecting, troweling, knife-coating, brushing, rolling, roller coating, pouring, laminating, in-mold coating or coextruding.

The water-emulsifiable polyisocyanate formulations of the invention can advantageously be used in polyurethane coatings as curing components in addition to at least one binder.

The reaction with binders can optionally be effected after a long period of time as required by corresponding storage of the water-emulsifiable polyisocyanate formulation. Water-emulsifiable polyisocyanate formulations are preferably stored at room temperature, but can also be stored at higher temperatures. In practice, it is entirely possible to heat such a water-emulsifiable polyisocyanate formulation to 40° C., 60° C., or even to 80° C.

The binders may, for example, be polyacrylate polyols, polyester polyols, polyether polyols, polyurethane polyols, polyurea polyols, polyetherols, polycarbonates, polyester polyacrylate polyols, polyester polyurethane polyols, polyurethane polyacrylate polyols, polyurethane-modified alkyd resins, fatty acid-modified polyester polyurethane polyols, copolymers with allyl ethers, copolymers thereof, graft polymers thereof, and mixtures of the binders mentioned. Preference is given to polyacrylate polyols, polyester polyols, and polyurethane polyols.

The polyisocyanate formulation of the invention is likewise suitable for modification of aqueous adhesives, for example based on aqueous dispersions of solids content corresponding to a binder content of 10% to 65% by weight, preferably 20% to 60% by weight, such as natural latex, aqueous dispersions of homopolymers or copolymers of olefinically unsaturated monomers, and the aqueous polyurethane dispersions known per se.

Suitable dispersions of homopolymers or copolymers of olefinically unsaturated monomers are, for example, conventional dispersions of homopolymers or copolymers based on vinyl esters of carboxylic acids having 2 to 18, preferably 2 to 4, carbon atoms, such as vinyl acetate in particular, optionally with up to 70% by weight, based on total amount of olefinically unsaturated monomers, of other olefinically unsaturated monomers, and/or dispersions of homopolymers or copolymers of (meth)acrylic esters of alcohols having 1 to 18, preferably 1 to 4, carbon atoms, such as methyl (meth)acrylate, ethyl (meth)acrylate, propyl (meth)acrylate, hydroxyethyl (meth)acrylate or hydroxypropyl (meth)acrylate in particular, optionally together with up to 70% by weight of other olefinically unsaturated monomers, and/or dispersions of butadiene-styrene copolymers having a butadiene content of about 20 to 60% by weight, and/or of other diene polymers or copolymers such as polybutadiene or copolymers of butadiene with other olefinically unsaturated monomers such as styrene, acrylonitrile and/or methacrylonitrile, for example, and/or aqueous dispersions of polymers or copolymers of 2-chloro-1,3-butadiene, optionally with other olefinically unsaturated monomers of the type exemplified above, for example those with a chlorine content of about 30 to 40% by weight, in particular with a chlorine content of about 36% by weight.

Preference is given to aqueous dispersions of copolymers formed from 90% to 99.5% by weight of acrylates or methacrylates of alkanols containing 1 to 4 carbon atoms and 0.5% to 10% by weight, based in each case on the copolymer, of hydroxyalkyl acrylates and methacrylates having 2 to 20 carbon atoms in the hydroxyalkyl radical, such as hydroxyethyl, hydroxypropyl or hydroxybutyl acrylate or methacrylate. Such dispersions are known per se and can be prepared in conventional manner by emulsion polymerization (see Houben-Weyl, Methoden der organischen Chemie [Methods of Organic Chemistry], 4th edition, vol. E 20, p. 217 ff.).

Suitable aqueous polyurethane dispersions are those of the type known per se, as described, for example, in U.S. Pat. No. 3,479,310, GB-A 1 076 688, U.S. Pat. No. 4,108, 814, US-A 4 108 814, U.S. Pat. No. 4,092,286, DE-A 2 651 505, U.S. Pat. No. 4,190,566, DE-A 2 732 131 or DE-A 2 811 148.

The aqueous adhesives used may comprise the auxiliaries and additives customary in adhesives technology. These include, for example, fillers, such as quartz flour, quartz sand, finely divided silica, heavy spar, calcium carbonate, chalk, dolomite or talc, which are often used together with suitable wetting agents, such as polyphosphates, for example, such as sodium hexametaphosphate, naphthalenesulfonic acids, ammonium or sodium salts of polyacrylic acids, the wetting agents generally being added in amounts of 0.2% to 0.6% by weight, based on filler.

Further suitable auxiliaries are, for example, organic thickeners, to be used in amounts of 0.01% to 1% by weight, based on adhesive, such as cellulose derivatives, alginates, starch or starch derivatives or polyacrylic acid, for example, or inorganic thickeners, to be used in amounts of 0.05% to 5% by weight, based on adhesive, such as bentonites, for example.

Fungicides for preservation can also be added to the adhesives. They are generally used in amounts of 0.02% to 1% by weight, based on adhesive. Examples of suitable fungicides include phenol derivatives and cresol derivatives, and organotin compounds.

Tackifying resins such as natural resin or modified resins such as rosin esters or synthetic resins such as phthalate resins, for example, can likewise be present in the adhesive in known amounts.

Solvents too, such as toluene, xylene, butyl acetate, methyl ethyl ketone, ethyl acetate, dioxane or mixtures thereof, or plasticizers, such as those based on adipate, phthalate or phosphate, for example, can be added to the aqueous adhesive dispersions.

The polyisocyanate formulations of the invention are added to the aqueous adhesives generally in an amount of 1% to 20%, preferably 2% to 10%, by weight, based on the binder of the aqueous adhesive dispersion.

For this purpose, the nonaqueous polyisocyanate formulation of the invention can be stirred into the adhesive dispersion in a known manner. In some cases, good results are achieved when an aqueous dispersion is first prepared, and the latter is mixed with the adhesive dispersion.

The aqueous adhesives thus modified are suitable for bonding of any desired materials of the same kind or different kinds, for example for bonding of wood, paper, plastics, textiles, leather and inorganic materials, such as ceramic, earthenware or asbestos cement.

The examples which follow are to illustrate the invention in detail.

Isocyanate A:

HDI isocyanurate with an NCO content of 22.2% and a viscosity of 2800 mPa*s at 23° C. (Basonat® HI 100 NG from BASF SE).

Isocyanate B:

Mixture of 80 parts tolylene 2,4-diisocyanate and 20 parts tolylene 2,6-diisocyanate Polyether A:

Methanol-started monofunctional polyethylene oxide prepared under potassium hydroxide catalysis, having an OH number of 112 (to DIN 53240) and a molecular weight of 500 g/mol. The basic catalyst residues still present were then neutralized with acetic acid, and the product was desalinated. Potassium acetate formed is also removed here.

Catalysts According to the Invention:

Phosphorodithionic acid, mixed O,O-bis(2-ethylhexyl and butyl) ester zinc salts (V841 from Schäfer Additivsysteme GmbH)

Catalysts Not According to the Invention:

Zinc dineodecanoate (TIB KAT 616 from TIB-Chemicals)

Zinc diacetate (Sigma Aldrich)

Zinc di-2-ethylhexanoate (Alfa Aeser)

Hazen Color Number:

Methods of determining yellowness of technical liquids according to DIN ISO 6271. The standard used is an acidic solution of potassium hexachloroplatinate.

Viscosity:

In this document, viscosity is at 23° C. according to DIN EN ISO 3219/A.3 in a cone-plate system. $D=1000\ s^{-1}$.

COMPARATIVE EXAMPLE 1 (ANALOGOUS TO EXAMPLE 2 IN DE 103 50 242)

temperature in reaction step 2: 80° C.

COMPARATIVE EXAMPLE 2 (ANALOGOUS TO EXAMPLE 1 IN DE 103 50 242)

temperature in reaction step 2: 90° C.

COMPARATIVE EXAMPLE 3 catalysis by addition of zinc dineodecanoate 80° C.

COMPARATIVE EXAMPLE 4 catalysis by addition of zinc diacetate 80° C.

COMPARATIVE EXAMPLE 5 catalysis by addition of zinc di-2-ethylhexanoate 80° C.

EXAMPLE 1 (INVENTIVE)

catalysis by addition of phosphorodithionic acid, mixed O,O-bis(2-ethylhexyl and butyl) ester zinc salts 80° C.

EXAMPLE 2 (INVENTIVE)

catalysis by addition of phosphorodithionic acid, mixed O,O-bis(2-ethylhexyl and butyl) ester zinc salts 90° C.

Synthesis and Results

Process Step A:

200 g of polyether A was reacted with 34.5 g of isocyanate B at 60-85° C., optionally with addition of 320 ppm of zinc dineodecanoate, until no free NCO was detectable any longer.

Process Step B:

48.7 g of the product from process step A was mixed with 250 g of isocyanate A; optionally, 200 ppm of catalyst was added. The conversion was effected at 80° C. or 90° C. The reaction was stopped with para-toluenesulfonic acid.

TABLE

Process step 2 and product data

| Reference | Catalyst | Reaction time (min) | T in process step B (° C.) | NCO content (%) | Color (Hazen) |
|---|---|---|---|---|---|
| CE1 | no catalyst | 1470 | 80 | 17.2 | 50 |
| CE2 | no catalyst | 720 | 90 | 17.4 | 60 |
| CE3 | Zinc dineodecanoate | 480 | 80 | 17.4 | 70 |
| CE4 | Zinc diacetylacetonate | 360 | 80 | 16.1 | 95 (turbid) |
| CE5 | Zinc di-2-ethylhexanoate | 300 | 80 | 17.1 | 180 |
| IE1 | Zinc phosphorodithionic acid catalyst | 330 | 80 | 17.5 | 45 |
| IE2 | Zinc phosphorodithionic acid catalyst | 300 | 90 | 17.3 | 45 |

CE1 to CE2 have a much longer reaction time than the inventive examples. The color numbers of CE1 to CE5, especially those of CE3 to CE5, are higher than those of the inventive examples.

The invention claimed is:

1. A process for producing a water-emulsifiable polyisocyanate formulation, in which, in a first process step,
(A) a dispersion-active reaction product (E) is prepared from at least one diisocyanate selected from the group of hexamethylene 1,6-diisocyanate, pentamethylene 1,5-diisocyanate, 4,4'-di(isocyanatocyclohexyl)methane, 1-isocyanato-3,3,5-trimethyl-5-(isocyanatomethyl)cyclohexane, tolylene 2,4- and 2,6-diisocyanate, tetramethylxylylene diisocyanate, p-xylylene diisocyanate, 2,4'- and 4,4'-diisocyanatodiphenylmethane, with at least one mono- or polyhydric polyalkylene ether alcohol having 2 to 4 carbon atoms in the alkylene groups that comprises a polymer chain having at least 8 ethylene oxide units, and the resultant reaction product (E), in a second process step,
(B) is mixed with at least one (cyclo)aliphatic polyisocyanate having an average NCO functionality of 2.2 to 5.0,
wherein step (B) is performed in the presence of an allophanatization catalyst and the conditions are chosen such that (E) and the polyisocyanate form allophanate groups, characterized in that the allophanatization catalyst is at least one salt consisting of a metal cation and at least one dithiophosphate anion.

2. The process according to claim 1, wherein the allophanatization catalyst is a salt of the formula

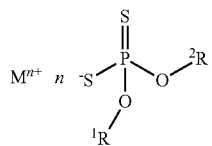

in which

M=Li, Cs, Na, K, Sb, Fe, Bi, Ge, Sn, Ba, Hg, Ti, Zr or Zn, $R_1$ and $R_2$ are the same or different and are each independently selected from a straight-chain or branched $C_1$- to $C_{20}$-alkyl group, an optionally substituted $C_5$- to $C_{12}$-cycloalkyl group, an optionally substituted $C_7$- to $C_{10}$-group, an optionally substituted $C_6$-$C_{12}$-aryl group, a hydrogen, a $C_1$-$C_{20}$-alkyl group or $C_6$ to $C_{12}$-aryl group optionally interrupted by one or more oxygen and/or sulfur atoms, a $C_1$-$C_{20}$-alkyl group or $C_6$ to $C_{12}$-aryl group optionally interrupted by one or more substituted or unsubstituted imino groups, and a $C_1$-$C_{20}$-alkyl group or $C_6$ to $C_{12}$-aryl group substituted by functional groups aryl, alkyl, aryloxy, alkyloxy, halogen, heteroatoms and/or heterocycles, and n is a positive integer.

3. The process according to claim 2, wherein M is Zn.

4. The process according to claim 1, wherein the dithiophosphate anion is O,O-diethyldithiophosphate, O,O-di-2-ethylhexyldithiophosphate, O,O-di-2-propylheptyldithiophosphate, O,O-diisobutyldithiophosphate, O,O-dicyclohexyldithiophosphate or O,O-bis-2,4,4-trimethylpentyldithiophosphate.

5. The process according to claim 2, wherein $R^1$ and $R^2$ are each independently the same or different and are a straight-chain or branched $C_1$- to $C_{20}$-alkyl group.

6. The process according to claim 1, wherein the (cyclo) aliphatic polyisocyanate has isocyanurate groups, biuret groups, urethane groups, allophanate groups and/or iminooxadiazinedione groups.

7. The process according to claim 1, wherein the (cyclo) aliphatic polyisocyanate is based on hexamethylene diisocyanate, pentamethylene diisocyanate and/or isophorone diisocyanate as monomers.

8. The process according to claim 1, wherein at least 10 mol % of urethane groups in the reaction product (E) formed in step (A) are converted to allophanate groups in process step (B).

9. The process according to claim 1, wherein the reaction product (E) obtained in process step (A) is used in process step (B) in an amount that the water-emulsifiable polyisocyanate formulation contains 1% to 25% by weight of reaction product (E).

10. The process according to claim 1, wherein process step (B) is conducted at a reaction temperature at least 10° C. higher than process step (A).

11. A polymer dispersion comprising a water-emulsifiable polyisocyanate formulation according to claim 1.

12. The polymer dispersion according to claim 11, wherein the water-emulsifiable polyisocyanate formulation is reacted with at least one binder containing isocyanate-reactive groups.

13. The polymer dispersion according to claim 12, wherein the binder is selected from the group consisting of polyacrylate polyols, polyester polyols, polyether polyols, polyurethane polyols, polyurea polyols, polyetherols, polycarbonates, polyester polyacrylate polyols, polyester polyurethane polyols, polyurethane polyacrylate polyols, polyurethane-modified alkyd resins, fatty acid-modified polyester polyurethane polyols, copolymers with allyl ethers, copolymers thereof, and graft polymers thereof.

14. A method of coating substrates, comprising applying the water-mollifiable polyisocyanate formulation according to claim 1 to a substrate.

15. A method comprising providing the water-emulsifiable polyisocyanate formulation according to claim 1 and including the formulation in primers, primer surfacers, pigmented topcoats, basecoats and clearcoats in the sectors of automobile finishing, automobile refinishing, industrial finishing, aircraft finishing, large vehicle finishing, plastic and wood finishing, in utility vehicles in the agricultural and construction sector, or as hardener in adhesives and sealing compounds.

* * * * *